Dec. 17, 1968      D. J. DADDONA, JR      3,416,200
PERMANENTLY LOCKING SNAP FASTENER
Filed March 22, 1967
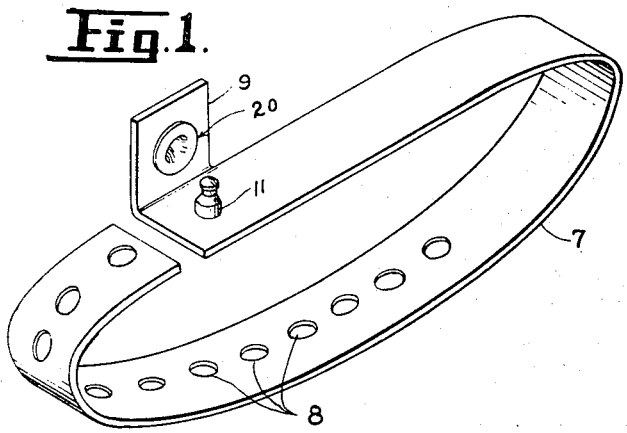
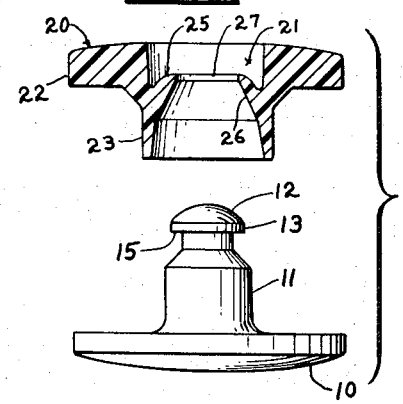
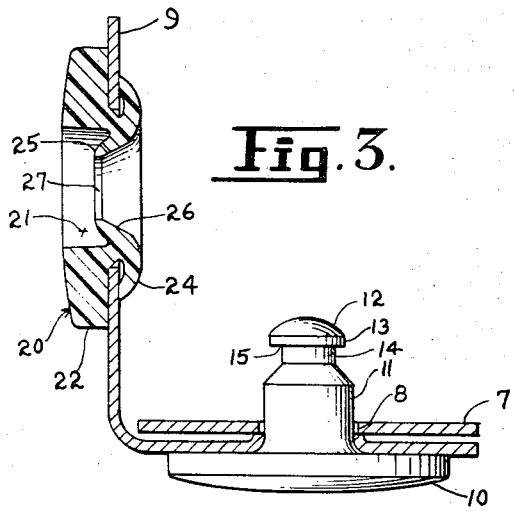
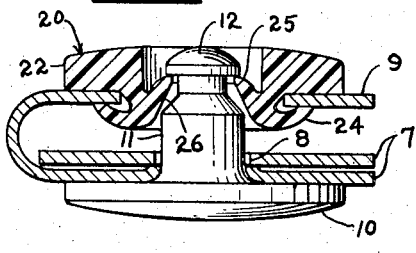
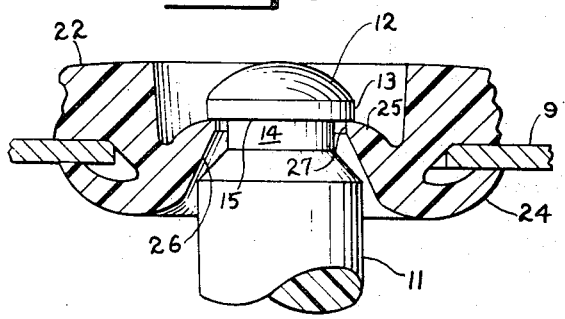
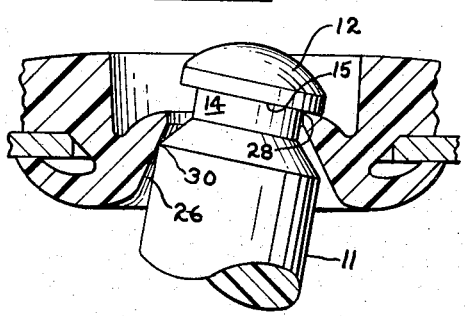

United States Patent Office 3,416,200
Patented Dec. 17, 1968

3,416,200
PERMANENTLY LOCKING SNAP FASTENER
Domenic J. Daddona, Jr., Waterbury, Conn., assignor to Scovill Manufacturing Company, Waterbury, Conn., a corporation of Connecticut
Filed Mar. 22, 1967, Ser. No. 625,173
4 Claims. (Cl. 24—208)

ABSTRACT OF THE DISCLOSURE

A permanently locking snap fastener as used on hospital identification bracelets and mail pouches economically made of plastic material, the socket and stud each consisting of a one-piece molding. An angular locking strut in the socket snaps behind an abrupt shoulder on the stud when the parts are brought together. The stud head is made solid rather than slotted, and the locking strut is preferably an uninterrupted wall to resist any such deformation as might permit the fastener to be pulled apart. The head must be made somewhat larger than the opening in the strut portion of the socket to permit manual engagement of the parts and a substantial clearance between the stud neck and the opening allows shifting of the stud head over the edge of the strut to lock the stud in the socket even more securely when an attempt is made to pull them apart.

---

This invention relates to permanently locking snap fasteners, sometimes called one-way snap fasteners, intended especially for use with hospital identification bracelets and mail pouches.

It is an improvement on the patent to Humiston 3,210,820. In that patent, there is disclosed a one-way snap fastener where the stud and socket are molded from plastic material to produce an economical fastener. While satisfactory for some purposes, it has been found in use that the Humiston fastener is not sufficiently strong so that in many instances the much more expensive metal fastener shown in the patent to Long 2,941,270 has been employed.

The principal object of this invention, therefore, is to retain the economy and other advantages of the one-piece plastic fastener elements but at the same time, to obtain at least as much security as the more expensive metal fastener.

In approaching this objective, in the preferred version the use of a slotted stud as in the Humiston patent or of a slitted wall in the socket opening must be avoided because such a stud or socket will deform under a severe pull and allow the fastener to come apart.

Other objects and advantages of the invention will hereinafter more fully appear.

In the accompanying drawing, I have shown for purposes of illustration, one embodiment which the invention may assume in practice. In the drawing:

FIG. 1 is a perspective view of a bracelet equipped with my improved fastener;

FIG. 2 shows the two elements of the fastener before attachment to the strap, the socket being shown in section;

FIG. 3 shows the two elements assembled to a strap with the strap and the socket shown in section;

FIG. 4 is a central section through the fastener after the socket and stud have been snapped together;

FIG. 5 is an enlargement of a portion of FIG. 4; and

FIG. 6 shows the action of the stud in the socket when a pull is placed on the parts carrying the fastener.

The fastener, of course, is adapted for securing any two overlapping parts and is here shown as applied to a strap 7 having holes 8 and a tab 9. The stud has a base 10 bearing against one surface of the strap 7 and a post with a large diameter section 11 frictionally held in one of the holes 8. The stud has a solid head with a dome-shaped end surface 12 merging into a narrow cylindrical surface 13 around the outer edge of the head. Inwardly of the stud head is a neck 14 of substantially smaller diameter than the head and providing an abrupt shoulder 15 facing toward the base 10.

The socket member 20 has an axially extending hole 21 and an annular base flange 22 bearing against the outer face of the tab 9. As molded, the socket 20 has a depending skirt portion 23 with a tapering wall and this serves as the means for attaching the socket to its parts. The attachment is accomplished by a riveting or setting operation to curl the skirt wall around the opening 21 against the inner surface of the tab as indicated at 24.

An annular locking strut 25 extends into the hole 21 in an angular direction toward the outer surface of the base flange 22. The inner surface 26 of the strut merges into the curled rim 24 to provide a funnel-shaped recess and the angle of this surface is preferably of the order of 25° to the axis of the hole 21. This recess terminates in a central opening 27 having a relatively sharp outer corner 28. The outer surface of the strut or wall 25 is preferably downwardly inclined as shown and convex so as to better prevent inversion of the strut under a heavy load. The diameter of the opening 27 is substantially larger than that of the stud neck 14, but of course, it must be somewhat smaller than the maximum diameter of the stud head at the cylindrical surface 13.

It will be understood that a plastic material will be selected for the socket and preferably also for the stud, which is comparatively rigid without being brittle. The locking strut 25 must be yieldable to some extent to allow passage of the stud head and yet sufficiently rigid to prevent bending after the parts are locked together. Of course, the acute angle of the funnel-shaped recess will aid in the wedging of the stud head through the socket opening 27. The strut 25 is preferably uninterrupted around the socket because if it were slitted as in many snap fasteners, it would be too weak to lock the stud securely.

An important element of the construction is the comparatively large clearance between the stud neck 14 and the opening 27. What happens when it is attempted to pull the fastener apart by applying force to the strap 7 and tab 9 is indicated in FIG. 6. The stud will angle in the socket when the corner 30 strikes the conical surface 26 and move the abrupt shoulder 15 over the sharp corner 28, so that the pull is resisted by the entire depth of the shoulder as against only the narrow purchase indicated in FIG. 5. It is, of course, necessary that the stud head be not too much larger than the opening 27 in order to allow manual assembling of the solid head through the solid strut wall. The shifting of the shoulder 15 over the locking strut provides the necessary purchase to take advantage of the full strength of the stud head.

The term "abrupt shoulder" as used herein and in the claims means a shoulder which does not slope appreciably from the head toward the base. It is intended to distinguish from the studs having a sloping surface which can cam against a socket member when a separating force is applied to the fastener.

What I claim is:

1. A permanently locking snap fastener for securing two parts in overlapping relation comprising
    (a) a one-piece rigid stud of plastic material having a base adapted to bear against the outer face of one of said overlapping parts, a post projecting centrally from said base, said post having a solid head with a dome-shaped end surface and a neck inwardly of said head providing an abrupt shoulder adjacent the head facing toward said base and an upwardly tapered shoulder facing the abrupt shoulder and spaced therefrom by the said neck; and (b) a one-piece socket of plastic material with an axially extending hole therethrough, said socket having an annular base flange adapted to bear against the outer face of the other of said overlapping parts, means for securing said socket in place on such other part and an annular locking strut extending into said hole in an angular direction toward the outer surface of said base flange and defining a funnel-shaped recess terminating in a central opening which has a diameter smaller than the maximum diameter of said stud head but substantially larger than that of said neck the strut having an upper surface inclining downwardly from its inner margin toward its outer margin to provide a bearing surface for the abrupt shoulder, whereby when the stud post is pushed into said socket opening, said dome-shaped head will wedge through said funnel-shaped recess until said locking strut snaps behind said abrupt shoulder; and whereby the clearance between said neck and said locking strut and between said upwardly tapered shoulder and said locking strut allows tilting of the stud and shifting of said stud head in a lateral direction so that any normal attempt to separate said parts will be more strongly resisted by a secure engagement of said abrupt shoulder bearing on the inclined upper surface of the strut and engagement of said upwardly tapered shoulder with the underside of said locking strut.

2. A permanently locking snap fastener as defined in claim 1 wherein the angle of the interior surface of said funnel-shaped recess is of the order of 25° to the axis of the socket opening.

3. A permanently locking snap fastener as defined in claim 1 wherein said locking strut is solid and uninterrupted.

4. A permanently locking snap fastener as defined in claim 1 wherein the stud as well as the socket are molded of plastic material which is comparatively rigid without being brittle.

References Cited

UNITED STATES PATENTS

| 3,110,068 | 11/1963 | Perrochat. | |
| 2,941,270 | 6/1960 | Long | 24—217 |
| 3,210,820 | 10/1965 | Humiston | 24—214 X |
| 2,610,879 | 9/1952 | Pope | 24—214 |
| 3,206,818 | 9/1965 | Knowlton | 24—208.3 |

FOREIGN PATENTS 1,385,691   12/1964   France.

DONALD A. GRIFFIN, *Primary Examiner.*